US009363380B2

(12) United States Patent
Shaw et al.

(10) Patent No.: US 9,363,380 B2
(45) Date of Patent: Jun. 7, 2016

(54) INTEGRATED VISUAL VOICEMAIL COMMUNICATIONS

(75) Inventors: Venson M. Shaw, Kirkland, WA (US); Gholam-Reza Rahsaz, Sammamish, WA (US)

(73) Assignee: AT&T Mobility II LLC, Atlanta, GA (US)

(*) Notice: Subject to any disclaimer, the term of this patent is extended or adjusted under 35 U.S.C. 154(b) by 547 days.

(21) Appl. No.: 12/635,320

(22) Filed: Dec. 10, 2009

(65) Prior Publication Data
US 2011/0143722 A1 Jun. 16, 2011

(51) Int. Cl.
*H04M 11/10* (2006.01)
*H04M 3/533* (2006.01)
*H04L 12/58* (2006.01)
*H04W 76/02* (2009.01)

(52) U.S. Cl.
CPC ....... *H04M 3/53333* (2013.01); *H04L 12/5895* (2013.01); *H04L 51/38* (2013.01); *H04W 76/02* (2013.01)

(58) Field of Classification Search
CPC . H04M 3/537; H04M 3/533; H04M 3/53333; H04M 2201/50; H04M 2203/253; H04M 2207/18; H04M 3/42153; H04M 1/2535; H04M 1/27455; H04M 1/72547; H04M 1/72552; H04M 2201/42; H04M 7/0024; H04L 29/06
USPC .................. 455/413, 414.1, 67.7, 66.1, 412.2, 455/422.1; 379/67.1, 88.18
See application file for complete search history.

(56) References Cited

U.S. PATENT DOCUMENTS

| 7,620,808 | B2* | 11/2009 | Le et al. .................. 713/153 |
| 2006/0130107 | A1* | 6/2006 | Gonder et al. ............. 725/110 |
| 2007/0180032 | A1* | 8/2007 | Pearson .................... 709/206 |
| 2008/0086700 | A1* | 4/2008 | Rodriguez et al. .......... 715/804 |
| 2008/0159167 | A1* | 7/2008 | Ito et al. .................... 370/252 |
| 2009/0061828 | A1* | 3/2009 | Sigmund et al. ........... 455/413 |
| 2009/0154663 | A1* | 6/2009 | Thaper ........... H04M 3/53325 379/88.11 |
| 2010/0150322 | A1* | 6/2010 | Yin et al. .................. 379/88.14 |
| 2010/0151831 | A1* | 6/2010 | Hao et al. ................. 455/412.2 |
| 2010/0151834 | A1* | 6/2010 | Kalbag .................... 455/413 |
| 2010/0323669 | A1* | 12/2010 | Maggenti et al. .......... 455/413 |
| 2011/0136474 | A1* | 6/2011 | Ren et al. ................. 455/412.2 |

* cited by examiner

*Primary Examiner* — Michael Faragalla
*Assistant Examiner* — Gerald Oliver
(74) *Attorney, Agent, or Firm* — Baker & Hostetler LLP

(57) ABSTRACT

A single visual voicemail communications session is established and used to provide various content to a visual voicemail client on a wireless device. Rather than requiring the establishment of multiple communications session in order to obtain messaging, multimedia, and other content types associated with a voicemail at a wireless device, all such content is obtained or accessed by a voicemail server and transmitted to the wireless device. The wireless device can provide visual voicemail client data to a voicemail server, enabling the voicemail server to modify content as needed so that it is compatible with the wireless device.

20 Claims, 10 Drawing Sheets

Figure 1 - Prior Art

INTEGRATED VISUAL VOICEMAIL COMMUNICATIONS

TECHNICAL FIELD

The technical field generally relates to wireless communications and more specifically relates to integration of visual voicemail communications and retrieval of related data.

BACKGROUND

Communications devices such as cellular telephones, mobile communication devices, personal digital assistants (PDAs), laptops, and the like are becoming more prevalent as technology advances and makes these devices more powerful and more affordable. These devices are also being constructed with increasing capabilities and can now perform functions that have in the past been performed by dedicated special function communications devices. For instance, a common mobile communications device today may have computing capabilities that allow the device to process multimedia content, the ability to communicate with data networks such as the Internet, a display than can render high quality still images and video, audio capabilities that allow the device to play music and video soundtracks, as well as the ability to place and receive traditional mobile telephone calls and text messages.

The expanding capabilities of mobile communications devices have allowed the improvement and enhancement of more traditional technologies. For example, voicemail has traditionally been an audio-only feature that requires a telephone connection to a voicemail server. Traditionally, a user would receive a message waiting notification that a voicemail is available, and the user would then have to dial into a voicemail server to listen to the message. Thanks to technological advances, visual voicemail is available on many mobile communications devices. Visual voicemail presents a visual interface to a user's voicemail box and allows the user to view attributes of voicemail and manipulate voicemail in various ways that were previously not possible. A user may delete or save voicemail through the visual interface without having to place a telephone call to a voicemail server. A user may also be able to see who the voicemail is from, when it was sent or received, and other characteristic of the voicemail without actually placing a telephone call to a voicemail server. Visual voicemail systems may also provide a means for a sender to include multimedia content to accompany a voice message or to be provided instead of a voice message.

Current visual voicemail services are typically implemented by requesting and establishing a session between a user device and a device in a wireless provider network to obtain visual voicemail data on a user's device. Then, to obtain any additional content, such as a video or song, a text message, or any other multimedia content, a separate session must be established between a user's device and the appropriate server or system. For example, as shown in FIG. 1, user's 110 device 111 may establish a communications session over network 101 with voicemail server 133 and download visual voicemail data upon receiving a notification of a new available voicemail. This may be accomplished through the use of visual voicemail client 113 configured on device 111. When viewed in light of the Open System Interconnection Reference Model ("OSI Model") communication between visual voicemail client 113 and a device in a wireless provider network may occur at the application layer using a communications session established at the transport layer, such as a transmission control protocol (TCP) session. For example, a packet data protocol (PDP) context may be activated for device 111 via communications session 152 between operating system 112 of device 111 and radio network controller (RNC) 132. This establishes communications configurations, such as an Internet protocol (IP) address, tunnel identifications, etc., that may be necessary or desired in order to set up a data communications session. PDP contexts may be established on a variety of network devices, including an RNC. Such devices may be configured or capable of maintaining a limited number of PDP contexts, and may be capable of establishing a limited number of PDP context in a set period of time.

Once a PDP context is established, data communications session 153, which may be a TCP session, may be established between a voicemail application running on device 111, such as visual voicemail client 113 and a network device, such as voicemail server 133. Once session 153 is established, voicemail server 133 may communicate with a device 111 and specifically with visual voicemail client 153 at the application layer and transmit voicemail data to visual voicemail client 153. Such data may include an indication that multimedia content associated with a voicemail is available. Communications session 153 that had been used for communicating voicemail data is then terminated, and in some instances the PDP context may be deactivated. In order to obtain or otherwise receive the multimedia content, device 111 must then set up another communications session with a appropriate device, such as a content server or a messaging server, and may also have to reestablish a PDP context. For example, in order to access a text message associated with a voicemail, messaging client 114 may be activated on device 111 and establish communications session 154 with messaging server 134. Messaging client 114 can then download, request, or otherwise obtain the associated message from messaging server 134. Similarly, if there is multimedia content associated with a voicemail, in order to access such content, content retrieval client 115 may be activated on device 111 and establish communications session 155 with content server 135. Content retrieval client 114 can then download, request, or otherwise obtain the associated multimedia content from content server 135. Once messages, multimedia content, or other data associated with a voicemail is obtained, such data may be presented to a user on device 111.

There are several drawbacks to the current methods of providing data or content associated with a visual voicemail. By requiring separate communications sessions, utilizing visual voicemail systems may be unnecessarily resource intensive. Establishing separate sessions to obtain associated content may result in the repeated reestablishment of PDP contexts, wasting resources on an RNC or other device configured to establish and maintain PDP contexts. It may also result in setting up several separate communications sessions in order to obtain data or content for a single voicemail. This results in unnecessary utilization of network, mobile device, and server resources. The user experience may also be affected, as the user may be required to interface with several different applications on a device just to obtain the content associated with a single voicemail.

SUMMARY

Systems and method are disclosed for integrating the communications of all voicemail-related data and content into a single communications session. Upon receipt of a notification of an available voicemail, a user device may activate a visual voicemail client. The visual voicemail client can then establish a communications session with a voicemail server. The voicemail server can transmit all the content and/or data associated with the voicemail to the user device over the communications session. Alternatively, the user device may receive data indicating content and/or data that is associated with a voicemail, and may then transmit a request for specific content to the voicemail server via the communications session. Upon receiving content and/or data associated with a voicemail, a user device's visual voicemail client can transmit or convey such content and/or data to local clients, applications, or other components that can then render the data and/or content or otherwise present the content and/or data to a user.

In some embodiments, the voicemail server may obtain or otherwise access all available content and/or data associated with a voicemail upon determining that the voicemail exists. The content and/or data may be obtained from other network devices such a messaging and multimedia content servers. In other embodiments, the voicemail server may receive a request for content and/or data associated with a voicemail, and may responsively transmit the requested content to a user device via the communications session established with the visual voicemail client. The visual voicemail client can also transmit client and device configurations, compatibilities, preferences, etc. to the voicemail server. The voicemail server can use this data to manipulate content and/or data associated with a voicemail before transmitting such content and/or data to a user device. These and additional aspects of the current disclosure are set forth in more detail below.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1:
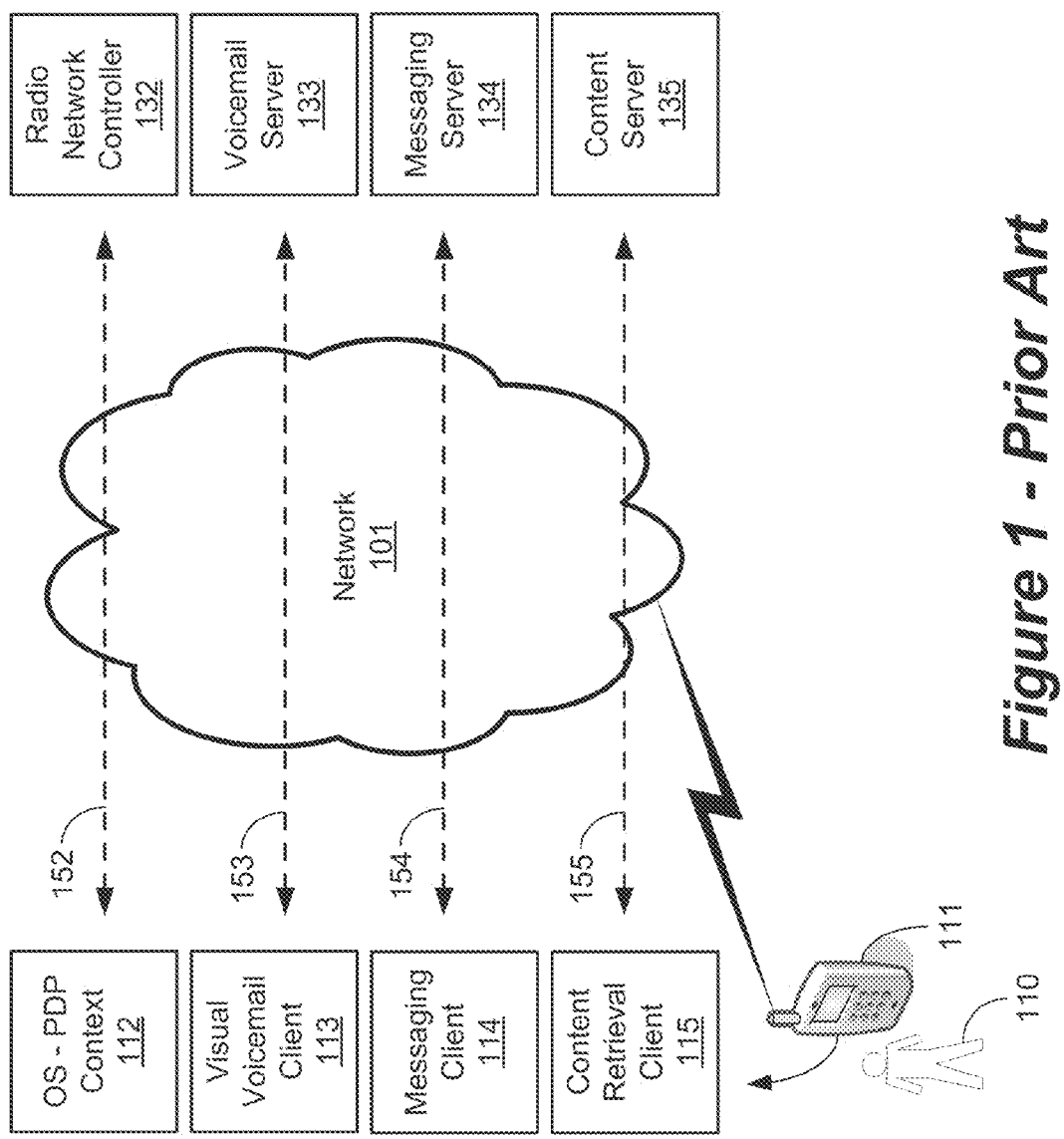
FIG. 1 is a block diagram of a prior art network environment in which traditional visual voicemail data communications take place.
Figure 2:
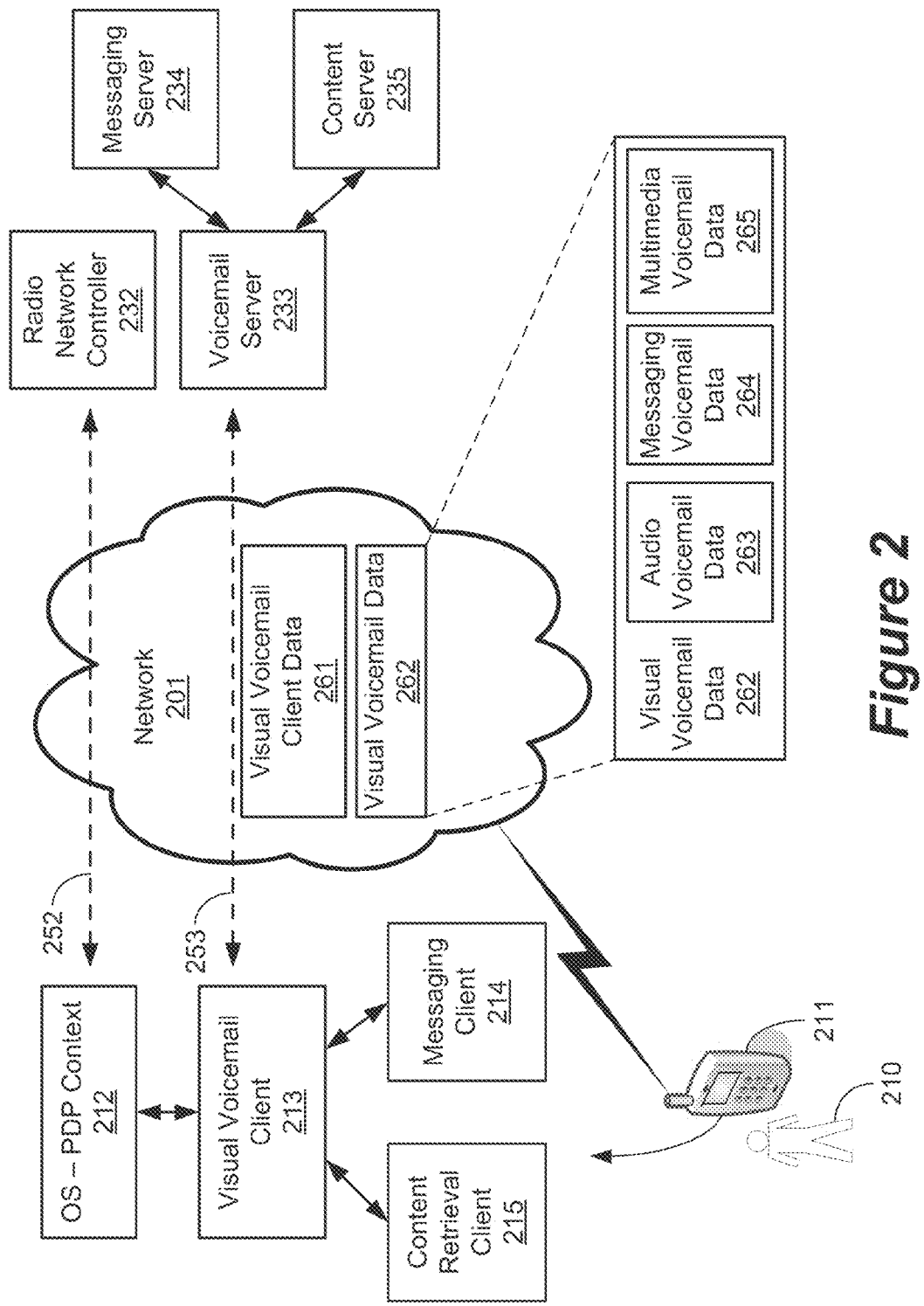
FIG. 2 illustrates a non-limiting exemplary network environment in which integrated visual voicemail communications may be implemented.

FIG. 2 illustrates a network environment in which one or more embodiments of an integrated visual voicemail communications system may be implemented. User 210 may operate wireless device 211. Wireless device 211 may be any type of wireless mobile communications device, including a mobile telephone, smart phone, personal data assistant (PDA), mobile computer, wireless email device, or any combination thereof. Alternatively, while wireless device 211 as illustrated represents wireless mobile communications devices, wireless device 211 may also represent a wired device, such as a landline telephone, computer, email device, or any other communications device or any combination thereof. All such embodiments are contemplated as within the scope of the present disclosure.

Wireless device 211 may communicate with network 201. Network 201 may be any type of network capable of providing wireless services to wireless devices of any type. Network 201 represents any number of interconnected networks that may be composed of any number and type of wired and/or wireless network devices. Network 201 may enable wireless device 211 to communicate with devices accessible via network 201, including with other mobile devices. Additionally, network 201 may enable wireless device 211 to communicate with computing devices such as voicemail server 233 and other servers accessible via network 201 such as web servers. Such communication may be voice, data, or a combination thereof. All such embodiments are contemplated as within the scope of the present disclosure.

In one embodiment, a notification of a new available voicemail may be sent to wireless device 211 by voicemail server 233 or another device over network 201. In response to detecting such a notification, or simply due to user's 210 desire to interact with a visual voicemail system, user 210 may activate and interact with visual voicemail client 213 that may be configured on wireless device 211. Visual voicemail client 213 may be any software, hardware, or combination of software and hardware configured to allow user 210 to interact with a visual voicemail system by operating wireless device 211. Such software may be configured to interact with voicemail server 233 and/or related systems or components. Alternatively, such software may perform some or all of the processing required to receive and process information, data, and/or content associated with a voicemail. In another alternative, no specialized visual voicemail client may be configured on wireless device 211, and all necessary voicemail data processing may be accomplished through wireless device 211 by voicemail server 233 and/or related systems or components. In such a system, the visual voicemail interface presented to user 210 may be web-based, and may be presented within a webpage displayed on wireless device 211 using appropriate software such as a web browser.

In order to communicate with network 201, operating system 212 of wireless device 211 may request activation by network 201 of a PDP context. Such a request may be transmitted to a device such as radio network controller (RNC) 232 via communications session 252. This request may enable network layer communications between wireless device 211 and network 201. Once a PDP context is activated, visual voicemail client 213 may establish a transport layer communications session, such as communications session 253, and, in some embodiments, one or more higher layer sessions to communicate at the application layer with voicemail server 233 and/or related systems or components. In one embodiment, communications session 253 may be a transmission control protocol (TCP) session. In some embodiments, visual voicemail client 213 may communicate with operating system 212 to inform operating system 212 of the status of visual voicemail client 213. For instance, visual voicemail client 213 may inform operating system 212 when the communications session between visual voicemail client 213 and voicemail server 233 has been terminated. Operating system 212 may be configured to maintain, or to not request deactivation, of the established PDP context until it is informed by visual voicemail client 213 that the communications session between visual voicemail client 213 and voicemail server 233 is terminated.

In one embodiment, an exemplary voicemail system may be operated, at least in part, by voicemail server 233, which may be associated with a network that provides wireless communications services to user 210. Alternatively, voicemail server 233 may be owned, operated, or maintained by a third party, and may be a component of a third party system that provides voicemail services to the operator of network 201 or any other network operator. Voicemail server 233 may be any one or more computing devices and/or software capable of performing voicemail functions as described herein. Voicemail server 233 may be dedicated to performing voicemail functions, or may be a component of a device or system that performs other functions in addition to voicemail functions.

Once communications session 253 has been established, visual voicemail data 262 may be provided to visual voicemail client 213. Such data is transmitted automatically by voicemail server 233 to visual voicemail client 213 upon establishment of communications session 253, or may be transmitted from voicemail server 233 upon receipt of a specific request for such data from visual voicemail client 213.

Visual voicemail data 262 may include indicators of content and/or data associated with a voicemail, and/or visual voicemail data 262 may include actual content and/or data associated with a voicemail. For example, as seen in expanded visual voicemail data 262 shown in FIG. 2, visual voicemail data 262 may include audio voicemail data 263. Audio voicemail data 263 may be simply an indicator that visual voicemail client 213 can detect indicating that a voice portion of a visual voicemail exists and is available. Alternatively, audio voicemail data 263 may be audible content that, when played or otherwise activated on wireless device 211, provides an audible indicator of a voice portion of a visual voicemail. In yet another alternative, audio voicemail data 263 may be actual audible content from a voice portion of a visual voicemail, or a representation thereof. For example, audio voicemail data 263 may be a recording of the first ten seconds of a voice portion of a visual voicemail, or it may be a recording of the entirety of a voice portion of a visual voicemail. Any other audio or audible data or content may be included in audio voicemail data 263, and all such embodiments are contemplated as within the scope of the present disclosure.

Visual voicemail data 262 may also include messaging voicemail data 264. Messaging voicemail data 264 may be portions of or the entirety of an actual text message, instant message, email, or any similar communication, or it may be simply an indicator that can be recognized by visual voicemail client 213 indicating that a messaging portion of a visual voicemail exists and is available. Likewise, visual voicemail data 262 may include multimedia voicemail data 265 that may be portions of or the entirety of one or more pieces of multimedia content, or it may be simply an indicator that can be recognized by visual voicemail client 213 indicating that a multimedia portion of a visual voicemail exists and is available.

Because not all devices and account configurations are the same, it may be useful for voicemail server 233 to be aware of configurations and capabilities of visual voicemail client 213 and/or wireless device 211. Thus, in some embodiments, during communications session 253, visual voicemail client data 261 maybe transmitted to voicemail server 233 from visual voicemail client 213. Visual voicemail client data 261 may include any useful indications of the capabilities, compatibilities, configurations, and any other data concerning visual voicemail client 213 and/or wireless device 211. For example, upon establishing communications session 253, visual voicemail client 213 may proactively, or in response to a request from voicemail server 233, transmit visual voicemail client data 261 to voicemail server 233. In one embodiment, visual voicemail client data 261 may include an indication that visual voicemail client 213 and/or wireless device 211 is configured to receive certain types of messages (e.g. short message service messages) and/or an indication that visual voicemail client 213 and/or wireless device 211 is not configured to receive certain types of messages (e.g. multimedia messaging service (MMS) messages). Alternatively, visual voicemail client data 261 may include an indication that visual voicemail client 213 and/or wireless device 211 is configured to receive only content that is smaller than a certain size. For example, a user may have configured visual voicemail client 213 and/or wireless device 211 to only receive multimedia content that is less than one megabyte due to concerns about charges for data communications. Any other capabilities, compatibilities, configurations, and any other data concerning visual voicemail client 213 and/or wireless device 211 may be included in visual voicemail client data 261, and all such data is contemplated as within the scope of the present disclosure. Voicemail server 233 can use such information or data to obtain, format, or otherwise manipulate or determine not to manipulate content and/or data associated with a voicemail, as described in more detail herein.

In some embodiments, voicemail server 233 may proactively obtain, gather, or otherwise access some or all data and/or content that is associated with a voicemail. For example, upon creation of a voicemail, including creation or attachment of messaging data and/or multimedia content, and/or upon transmission of a notification of an available voicemail to wireless device 211, voicemail server 233 may gather all such content and data and include that data in visual voicemail data 262 that is transmitted to visual voicemail client 213 and wireless device 211. Alternatively, voicemail server 233 may gather content and/or data based on user preferences or configurations that may be contained in visual voicemail client data 261, and transmit such content and/or data to visual voicemail client 213 and wireless device 211. In another alternative, voicemail server 233 may gather all or portions of content and/or data associated with a voicemail, and manipulate such content and/or data according to user preferences or configurations that may be contained in visual voicemail client data 261 before transmit such content and/or data to visual voicemail client 213 and wireless device 211. Any combination of these actions may be performed by voicemail server 233, and all such embodiments are contemplated as within the scope of the present disclosure.

In another embodiment, voicemail server 233 may not be configured to proactively obtain content and/or data associated with a voicemail. In such an embodiment, visual voicemail data 262 may include only indications of available content and/or data. Upon activation by user 210, or due to a configuration of visual voicemail client 213, visual voicemail client may transmit a request for some or all associated content and/or data to voicemail server 233. In response to such a request, voicemail server 233 may then obtain or access some or all of the associated data and/or content and transmit such to visual voicemail client 213 and wireless device 211. In such an embodiment, voicemail server 233 may obtain and/or manipulate the data and/or content based on user preferences or configurations that may be contained in visual voicemail client data 261. Note that in some embodiments, some content and/or data associated with a voicemail may be proactively sent to a user device, while other content and/or data associated with the same voicemail may not be sent to a user device until a request for such data and/or content is received. The determination of which data and/or content to send to a user device proactively and which data and/or content to send to a user device only upon receipt of a request may be made based on visual voicemail client data 261, voicemail server 233 configurations, or any other criteria. All such embodiments are contemplated as within the scope of the present disclosure.

In order to obtain data and/or content to be sent to visual voicemail client 213 and wireless device 211, voicemail server 233 may communicate with other devices and serve as a central gathering point for such data and/or content. For example, voicemail server 233 may request, be proactively sent, or otherwise obtain messaging data and content from messaging server 234. Similarly, voicemail server 233 may request, be proactively sent, or otherwise obtain multimedia data and content from content server 235. Any other devices, components, or servers may be in communication with voicemail server 233 and any of these devices may provide content and/or data associated with a voicemail to voicemail server 233. By serving as a central gathering point for voicemail content and related data, voicemail server 233 can provide such content and related data to visual voicemail client 213 and wireless device 211 using communications session 253, thus preventing the need for establishing other communications sessions to obtain such content. This reduces the use of network and user device resources.

Upon receiving content and/or data associated with a voicemail from voicemail server 233 via communications session 253, visual voicemail client 213 may then transmit or otherwise communicate such content and/or data to other components of wireless device 211. For example, visual voicemail client 213 may not be configured to present SMS messages to user 210 on wireless device 211. Accordingly, visual voicemail client 213 may transmit SMS message data to messaging client 214. Messaging client 214 may then present the SMS message to user 210. Similarly, visual voicemail client 213 may not be configured to present video content to user 210 on wireless device 211. Accordingly, visual voicemail client 213 may transmit video data to content retrieval client 215. Content retrieval client 215 may then present the video content to user 210. By serving as a primary receiver for voicemail content and related data, visual voicemail client 213 can provide such content and related data to various clients and software on wireless device 211, thus preventing the need for such clients and software to establish other communications sessions to obtain such content. This reduces the use of network and user device resources.

Figure 3:
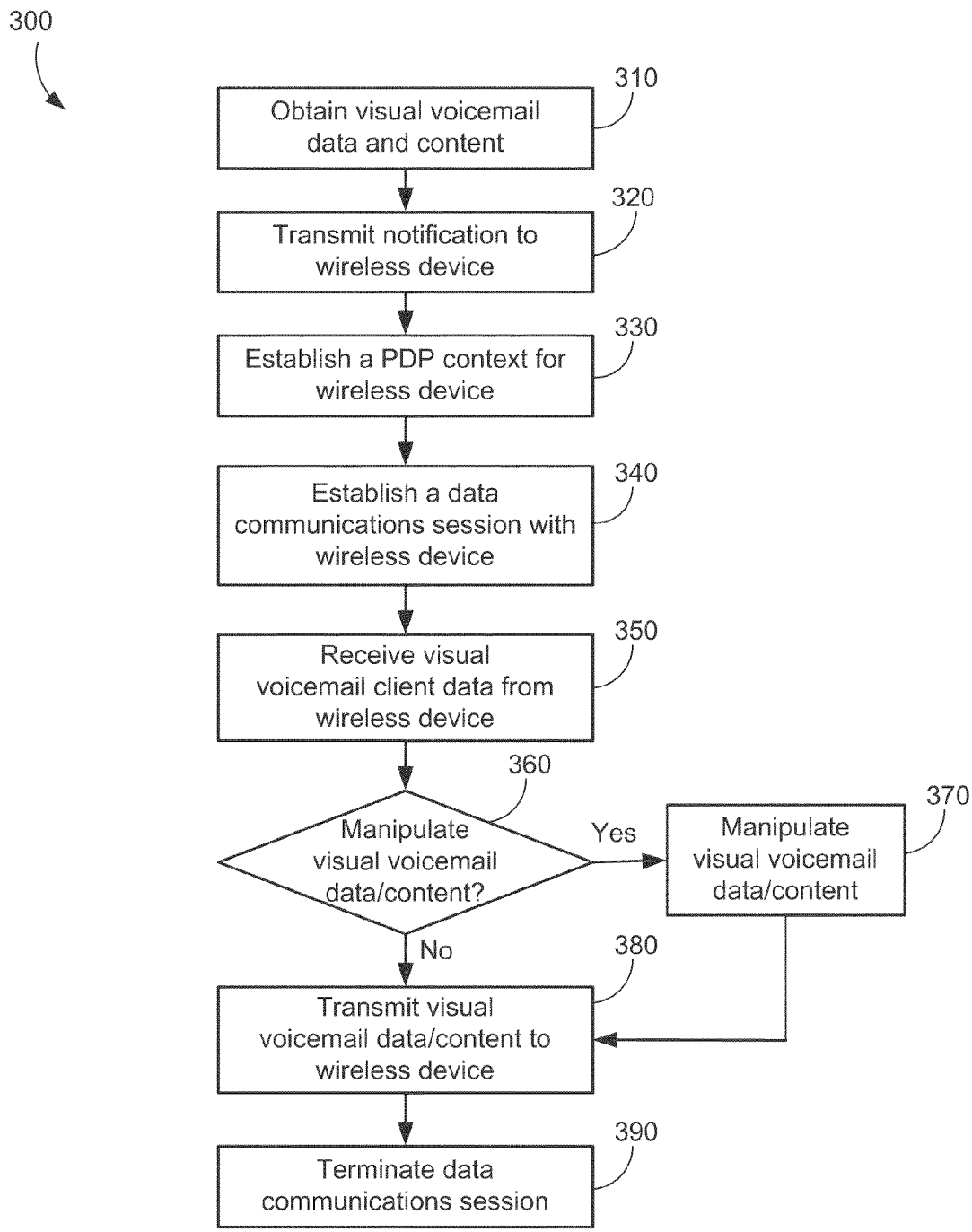
FIG. 3 illustrates a non-limiting exemplary method of implementing integrated visual voicemail communications.

Method 300 illustrated in FIG. 3 is one exemplary, non-limiting embodiment of a method of implementing the present disclosure. Method 300 may be performed by network and/or provider devices that are configured to interact with a wireless device and/or a visual voicemail client configured on a wireless device. At block 310, visual voicemail content and/or data may be obtained on a network device, such as a voicemail server. In one embodiment, all content associated with a voicemail is obtained before a communications session with a user device is established. For example, a voicemail server may be configured to detect a new available voicemail and automatically request all associated content from other devices that may be storing such content. In such an example, a voicemail server may be configured to determine that a voicemail has associated messaging content and multimedia content, and may automatically send requests to a messaging server and a multimedia server for such content. In other embodiments, content devices such as a messaging server and/or a content server may be configured to automatically provide voicemail-related content and/or data to one or more voicemail servers. Any method or means of obtaining, requesting, or otherwise gaining access to content and/or data associated with a voicemail is contemplated as within the scope of the present disclosure.

At block 320 a notification of an available voicemail and/or related data and/or content may be transmitted to an appropriate wireless device. This may be accomplished using any effective means. At block 330, a PDP context may be established for such a wireless device. The PDP context may be established by any network element, including an RNC or a voicemail server, in response to receiving a request to establish a PDP context from the wireless device. Alternatively, the PDP context may be established automatically by a network device responsive to some criteria, such as the detection of an available voicemail for the wireless device or the detection of transmission of an available voicemail notification, etc.

At block 340, a data communications session may be established between a wireless device and a voicemail server. In one embodiment, this may be a TCP session. Alternatively, or in addition, other sessions may be created at any layer of the OSI model. At block 350, visual voicemail client data may be received from the wireless device participating in the communications session established at block 340. The visual voicemail client data may include any data relating to the wireless device's visual voicemail client configuration, compatibilities, and/or capabilities, and/or may include data concerning the wireless device's configuration, compatibilities, and/or capabilities. For example, the visual voicemail client data may include an indicator that a device supports particular messaging and/or media protocols, has a certain data communications bandwidth capability, a voicemail client configured to process certain file types, etc. Any configurations, compatibilities, capabilities, and/or any other data that may be used in a voicemail system may be received at block 350, and all such data is contemplated as within the scope of the present disclosure.

At block 360, a determination may be made as to whether the content and/or data associated with a voicemail should be manipulated in some manner. This determination may be based on the visual voicemail client data received at block 350, or may be based on other configurations of the voicemail server and/or the user's wireless device. If manipulation is to be performed, any such manipulation is performed at block 370. For example, the visual voicemail client data received at block 350 may indicate that a user's wireless device only supports messaging on a first format, while a voicemail may have associated with it a message in a second format. In such a case, at block 370 a voicemail server may convert the message from the second format into the first format, or perform other manipulations to allow the user to view the message on the wireless device, or otherwise notify the user of the existence of the message. Any other manipulations may be performed, and all such manipulations are contemplated as within the scope of the present disclosure.

If there are no manipulations to perform, or if any manipulations are complete, at block 380 the visual voicemail content and/or data may be transmitted to a user's wireless device. Such transmissions may take any form and use any effective means. The transmission of content and/or data associated with a voicemail may take place using the communications session established at block 340. By using the same communications session for all voicemail-related communications of data, separate communications sessions do not have to be established to acquire various portions of the voicemail-related data. This eases the demand on network and wireless device resources, thereby allowing more efficient use of such resources.

At block 390, the communications session established at block 340 may be terminated. In some embodiments, this may also include the deactivation of the PDP context for the wireless device. Note that any other voicemail-related activities or voicemail-related communications, including the performance of activities described in the blocks of method 300, may be performed before the termination of the communications session at block 390.

In another embodiment, rather than obtaining or otherwise acquiring access to all voicemail-related content and/or data, a voicemail server, or any device serving a similar function, may acquire voicemail-related content and/or data upon receiving a request from a user's wireless device. Note that in some embodiments, aspects of the methods illustrated in FIGS. 3 and 4 may be combined or used in conjunction. For example, some voicemail-related data and/or content may be automatically acquired by a voicemail server while other voicemail-related data and/or content may only be acquired upon request from a wireless device or visual voicemail client. All such embodiments are contemplated as within the scope of the present disclosure.

Figure 4:
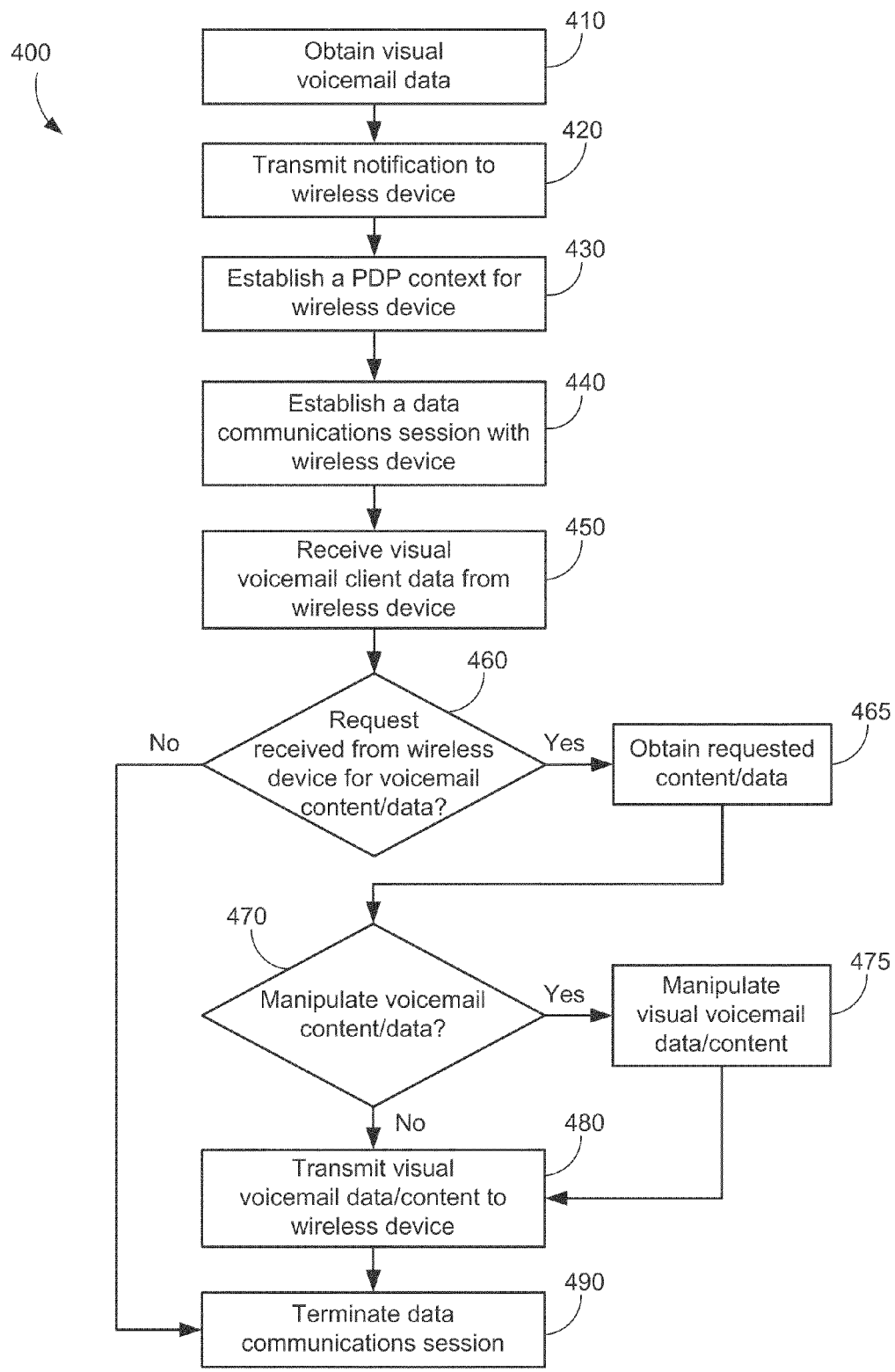
FIG. 4 illustrates another non-limiting exemplary method of implementing integrated visual voicemail communications.
Figure 5:
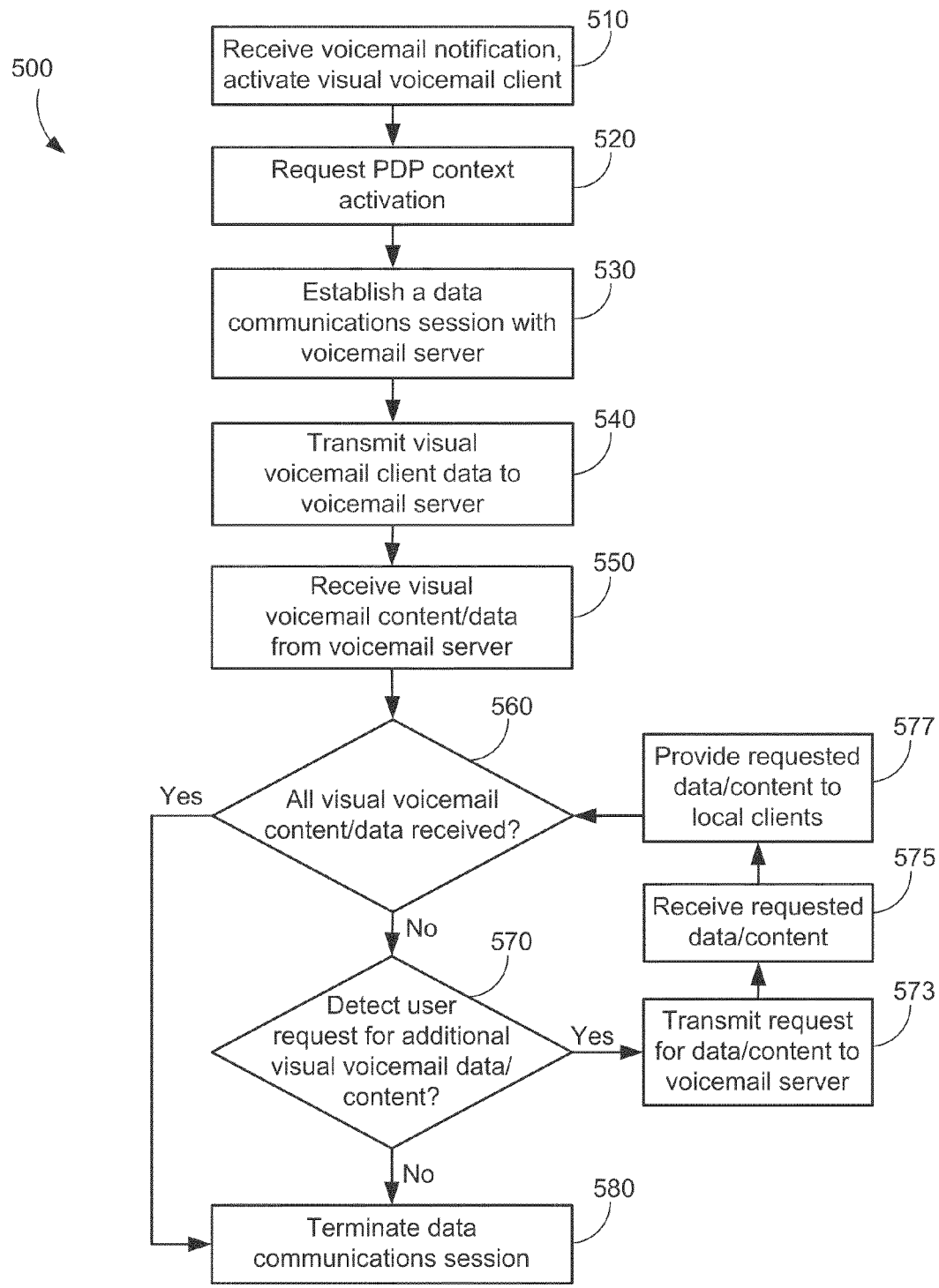
FIG. 5 illustrates another non-limiting exemplary method of implementing integrated visual voicemail communications.

Referring now to FIG. 4, at block 410, visual voicemail data may be obtained on a network device, such as a voicemail server. This may include merely an indication that a new voicemail is available, or the visual voicemail data may also include specifics about what content and/or data is associated with the voicemail, where such content and/or data may be obtained or accessed, and/or any other data pertaining to a voicemail. Note that the voicemail data obtained at block 410 may include data that is not actually used or recognized by a voicemail server, but is instead meant for a wireless device. For example, a block of data associated with a voicemail may be received on a voicemail server. The block of data may include indicators of content and/or data associated with a voicemail, but such indicators may not be recognized by the voicemail server. This block of data may then be provided to a wireless device, for example via the notification provided at block 420 or via any other means, that can interpret it and determine what content is associated with the voicemail. In other alternatives, the voicemail server may recognize all voicemail data provided to it. Any method or means of obtaining, requesting, or otherwise gaining access to voicemail data associated is contemplated as within the scope of the present disclosure.

At block 420 a notification of an available voicemail and/or related data and/or content may be transmitted to an appropriate wireless device. This may be accomplished using any effective means. At block 430, a PDP context may be established for such a wireless device. As with method 300, the PDP context may be established by any network element, including an RNC or a voicemail server, in response to receiving a request to establish a PDP context from the wireless device. Alternatively, the PDP context may be established automatically by a network device responsive to some criteria, such as the detection of an available voicemail for the wireless device or the detection of transmission of an available voicemail notification, etc.

At block 440, a data communications session may be established between a wireless device and a voicemail server. Similar to method 300, in one embodiment this may be a TCP session. Alternatively, or in addition, other sessions may be created at any layer of the OSI model. At block 450, visual voicemail client data may be received from the wireless device participating in the communications session established at block 440. The visual voicemail client data may include any data relating to the wireless device's visual voicemail client configuration, compatibilities, and/or capabilities, and/or may include data concerning the wireless device's configuration, compatibilities, and/or capabilities. For example, the visual voicemail client data may include an indicator that a device supports particular messaging and/or media protocols, has a certain data communications bandwidth capability, a voicemail client configured to process certain file types, etc. Any configurations, compatibilities, capabilities, and/or any other data that may be used in a voicemail system may be received at block 450, and all such data is contemplated as within the scope of the present disclosure.

At block 460, a determination is made as to whether a request for content and/or data associated with a voicemail has been received from a wireless device. Such a request may take any effective form. In most embodiments, such a request is received during the communications session established at block 440 so that additional communications sessions do not have to be established, thus conserving network and user device resources. If a request has been received at block 460, then at block 465, the requested content and/or data associated with the voicemail may be obtained or otherwise accessed. For example, a user may detect through the use of a visual voicemail client on the user's wireless device that a voicemail has a video associated with it. The user may select a control that generates and transmits a request for the video to a voicemail server. Responsive to receiving such a request, the voicemail server may transmit a request for the video to a multimedia content server that may then transit the video to the voicemail server. In a similar fashion a voicemail server may obtain messages, audio, images, or any other content or data that may be associated with a voicemail. Any method or means of obtaining, requesting, or otherwise gaining access to voicemail-related data and/or content is contemplated as within the scope of the present disclosure.

At block 470, a determination may be made as to whether the requested content and/or data associated should be manipulated in some manner. This determination may be based on the visual voicemail client data received at block 450, or may be based on other configurations of the voicemail server and/or the user's wireless device. If manipulation is to be performed, any such manipulation is performed at block 475. For example, the visual voicemail client data received at block 450 may indicate that a user's wireless device only supports video files in a first format, while a voicemail may have associated with it a video file in a second format. In such a case, at block 475 a voicemail server may convert the video file from the second format into the first format, or perform other manipulations to allow the user to view the video file on the wireless device, or otherwise notify the user of the existence of the video file. Any other manipulations may be performed, and all such manipulations are contemplated as within the scope of the present disclosure.

If there are no manipulations to perform, or if any manipulations are complete, at block 480 the requested visual voicemail content and/or data may be transmitted to a user's wireless device. Such transmissions may take any form and use any effective means. The transmission of content and/or data associated with a voicemail may take place using the communications session established at block 440. By using the same communications session for all voicemail-related communications of data, separate communications sessions do not have to be established to acquire various portions of the voicemail-related data. This eases the demand on network and wireless device resources, thereby allowing more efficient use of such resources.

If no requests for voicemail-related data and/or content are received, or if all such requests have been received and processed, at block 490, the communications session established at block 440 may be terminated. In some embodiments, this may also include the deactivation of the PDP context for the wireless device. Note that any other voicemail-related activities or voicemail-related communications, including the performance of any of the activities described in the blocks of method 400, may be performed before the termination of the communications session at block 490.

Method 500 illustrates a non-limiting, exemplary method of implementing the present disclosure on a user device such as a wireless device or mobile telephone. This method may also be implemented in one or more appropriately configured devices of any type. At block 510, a notification of an available voicemail may be received on a wireless device. This notification may take any effective form. Also at block 510, a visual voicemail client configured on the wireless device may be activated. This may be in response to a user manually activating the visual voicemail client, in one embodiment in response to detecting the notification. Alternatively, a wireless device may be configured to automatically activate a visual voicemail client upon receipt or detection of a notification of an available voicemail.

At block 520, a PDP context establishment may be requested by the wireless device. Note that this action may take place before or after the activation of the visual voicemail client on the wireless device. In an alternative embodiment, the PDP context may be established at the request of a network device, and in such cases, at block 520, the wireless device may be informed of the PDP context establishment. Any other steps required to establish a PDP context or otherwise gain data connectivity to a network may be performed at block 520.

At block 530, a communications session may be established between the wireless device and a voicemail server or other device performing voicemail functions. The communications session may be initiated by either the wireless device or the voicemail server. In some embodiments, this session may be a TCP session. Alternatively, or in addition, other sessions may be created at any layer of the OSI model.

At block 540, visual voicemail client data may be transmitted from the wireless device to the voicemail server via the communications session established at block 530. The visual voicemail client data may include any data relating to the wireless device's visual voicemail client configuration, compatibilities, and/or capabilities, and/or may include data concerning the wireless device's configuration, compatibilities, and/or capabilities. For example, the visual voicemail client data may include an indicator that a device supports particular messaging and/or media protocols, has a certain data communications bandwidth capability, a voicemail client configured to process certain file types, etc. Any configurations, compatibilities, capabilities, and/or any other data that may be used in a voicemail system may be transmitted at block 540, and all such data is contemplated as within the scope of the present disclosure. The visual voicemail client data may be proactively transmitted by the wireless device, or the voicemail server may request such data from the wireless device, with the wireless device transmitting the data in response. Note that the transmission of visual voicemail client data may occur at other points within method 500, and may be repeatedly performed as needed, for instance if any of the configurations within the visual voicemail client data change while the communications session established at block 530 is active.

At block 550, voicemail data from the voicemail server may be received. This may include data that provides an indication of other content and/or data that may be associated with a particular voicemail. Alternatively, the voicemail data received at block 550 may include some or all of the data and/or content that is associated with a particular voicemail. At block 560, a determination may be made as to whether all associated data and/or content has been received on the wireless device. If so, the communications session may be terminated at block 580.

If there is content and/or data associated with a voicemail that has not be received on the wireless device, at block 570 a determination may be made as to whether a user of the wireless device has requested content and/or data associated with the voicemail. Such a request may be detected by detecting the activation of a control by the visual voicemail client configured on the wireless device, such as the pressing of a virtual or actual button, the selection of a software control, or any other effective means.

If content and/or data have been requested by the user, at block 573, the visual voicemail client configured on the wireless device may transmit a request for the requested content and/or data to the voicemail server. In response, the voicemail server may obtain or access such requested content and/or data as described herein, and transmit the requested content and/or data to the wireless device. At block 575 the requested content and/or data may be received at the wireless device.

At block 577, if necessary, the requested content and/or data may be provided to local clients or other software and/or hardware on the wireless for rendering or other manipulation and/or presentation to the user. For example, if the requested content and/or data are an audio file, the audio file may be communicated or transmitted to an audio playback application configured on the wireless device for rendering or presentation to the user. Any manipulation or other processing that may be needed may also be performed at block 577. A further determination of whether any more content and/or data is available may be performed by returning to block 560 and detection of further requests for content and/or data may be performed by returning to block 570.

If no further requests for voicemail-related data and/or content are detected, or if all such data and/or content have been received and processed, at block 580, the communications session established at block 530 may be terminated. The closing of the communications session may be initiated by either the wireless device or the voicemail server. In some embodiments, this may also include transmitting a request for deactivation of the PDP context from the wireless device. Note that any other voicemail-related activities or voicemail-related communications, including the performance of any of the activities described in the blocks of method 500, may be performed before the termination of the communications session at block 580.

The methods and systems described above assist in reducing resource usage and increasing ease of use of visual voicemail systems by enabling the acquisition of all voicemail-related content and/or data within one communications session between a wireless device and a voicemail server or similar network device. By implementing the present disclosure, the user experience is improved and the use of resources on both the user side and the network side is reduced, lowering costs and saving time and resources. Set forth below are exemplary systems, devices, and components in which aspects of the present disclosure may be implemented.

Figure 6:
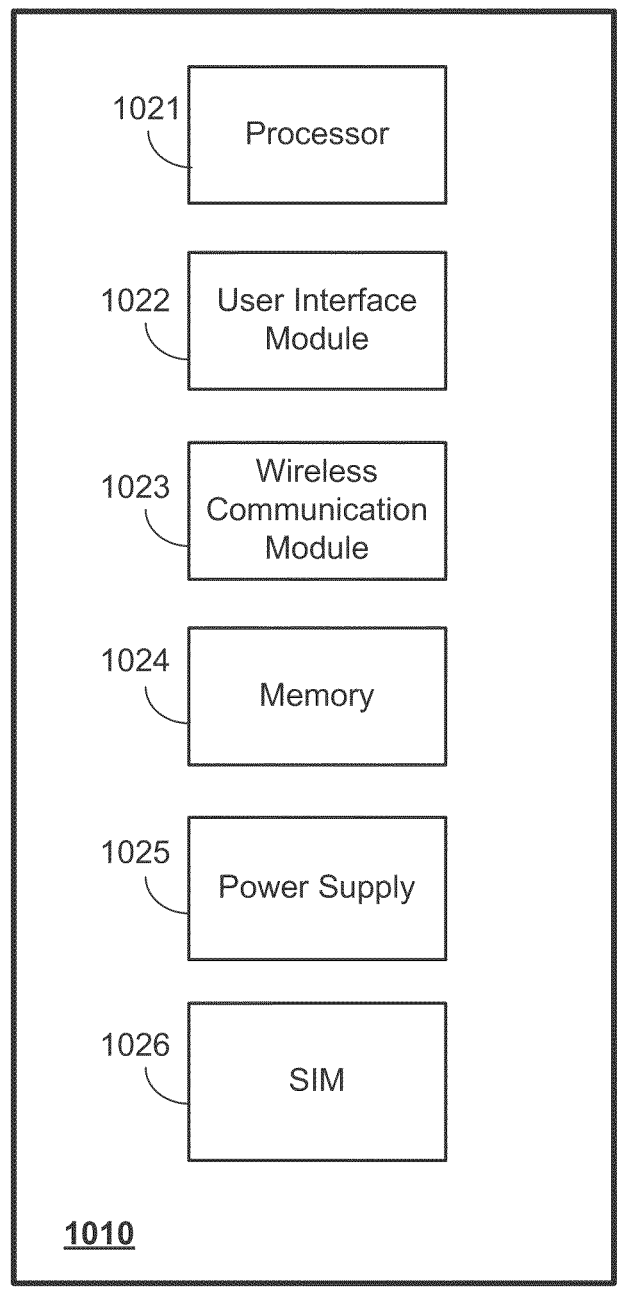
FIG. 6 is a block diagram of a non-limiting, exemplary wireless device that may be used in connection with integrated visual voicemail communications.

FIG. 6 illustrates an example wireless device 1010 that may be used in connection with an embodiment. References will also be made to other figures of the present disclosure as appropriate. For example, wireless device 211 may each be a wireless device of the type described in regard to FIG. 6, and may have some, all, or none of the components and modules described in regard to FIG. 6. It will be appreciated that the components and modules of wireless device 1010 illustrated in FIG. 6 are illustrative, and that any number and type of components and/or modules may be present in wireless device 1010. In addition, the functions performed by any or all of the components and modules illustrated in FIG. 6 may be performed by any number of physical components. Thus, it is possible that in some embodiments the functionality of more than one component and/or module illustrated in FIG. 6 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to visual voicemail data communications, for example. User interface module 1022 may be any type or combination of hardware and/or software that enables a user to operate and interact with wireless device 1010, and, in one embodiment, to interact with a system or software enabling the user to place, request, and/or receive calls, voicemail, voicemail notifications, voicemail content and/or data, and/or a system or software enabling the user to view, modify, or delete related software objects. For example, user interface module 1022 may include a display, physical and/or "soft" keys, voice recognition software, microphone, speaker and the like. Wireless communication module 1023 may be any type of transceiver including any combination of hardware and/or software that enables wireless device 1010 to communicate with wireless network equipment, for example, network 201, RNC 232, and voicemail server 233, or any other type of wireless communications network or network equipment. Memory 1024 enables wireless device 1010 to store information, such as voicemail notifications, visual voicemail client software, visual voicemail data and/or content, multimedia content, software to interact with voicemail systems and network devices, and voicemail preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 7:
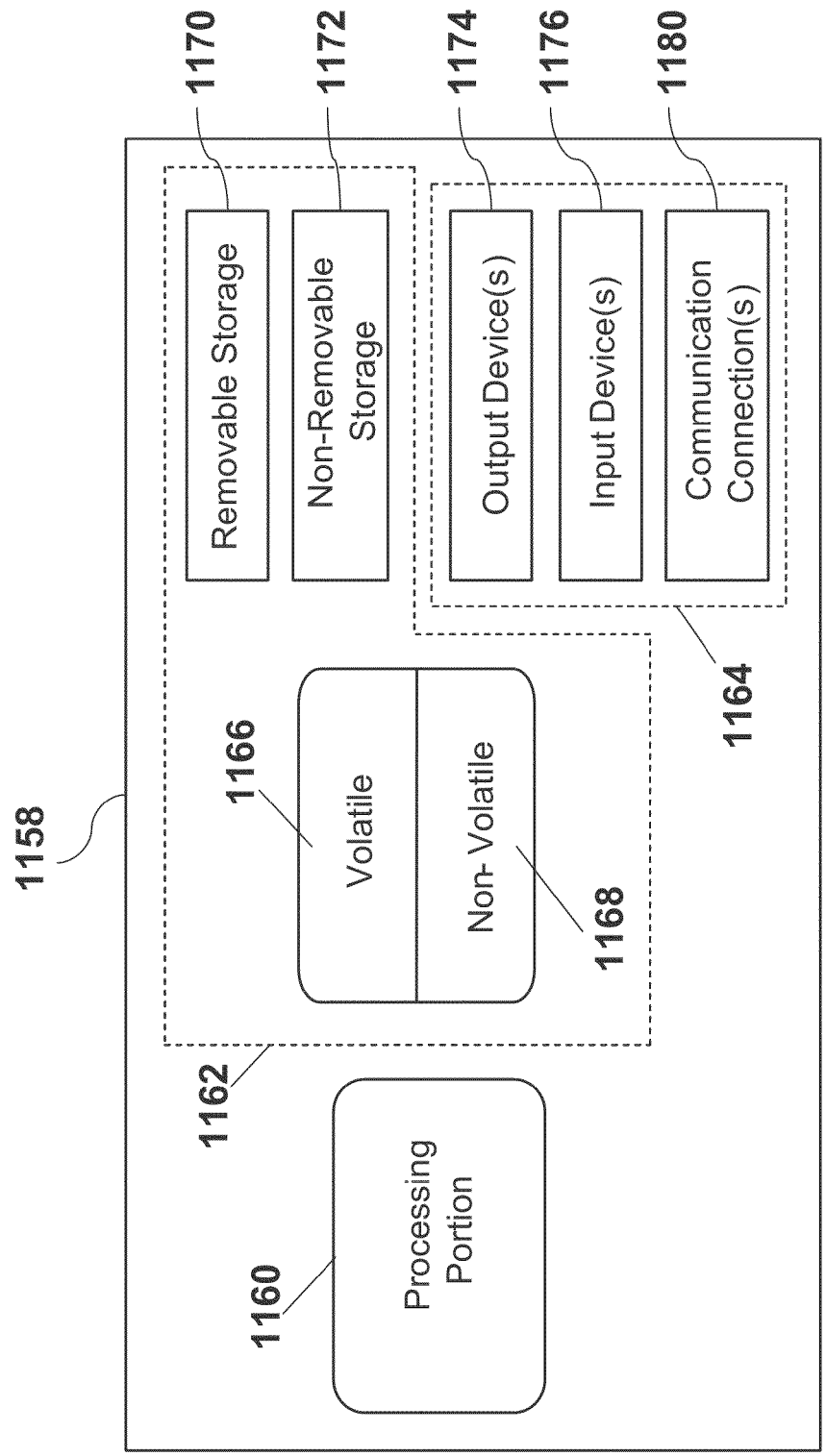
FIG. 7 is a block diagram of a non-limiting, exemplary processor in which integrated visual voicemail communications may be implemented.

FIG. 7 is a block diagram of an example processor 1158 which may be employed in any of the embodiments described herein, including as one or more components of wireless device 211, as one or more components of network equipment or related equipment, such as any component shown in FIG. 2, and/or as one or more components of any third party system or subsystem that may implement any portion of the subject matter described herein. It is emphasized that the block diagram depicted in FIG. 7 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 7, the processor 1158 comprises a processing portion 1160, a memory portion 1162, and an input/output portion 1164. The processing portion 1160, memory portion 1162, and input/output portion 1164 are coupled together (coupling not shown in FIG. 7) to allow communications between these portions. The input/output portion 1164 is capable of providing and/or receiving components, commands, and/or instructions, utilized to, for example, establish and terminate visual voicemail data communications, transmit and receive voicemail notifications, transmit, receive, store and process voicemail data and/or content, execute software to interact with voicemail systems, receive and store voicemail preferences and configurations, and/or perform any other function described herein.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing voicemail, voicemail data and/or content, calls, other telephonic communications, etc. For example, the memory portion is capable of storing voicemail preferences and/or software capable of processing call requests, operating a visual voicemail client, receiving calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network equipment as illustrated in FIG. 2. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

The network illustrated in FIG. 2 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how visual voicemail data communications may be implemented with stationary and non-stationary network structures and architectures in order to provide integrated visual voicemail communications. It can be appreciated, however, that integrated visual voicemail communications systems such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods for integrated visual voicemail communications can be applied independently of the method of data transport, and do not depend on any particular network architecture, or underlying protocols.

Figure 8:
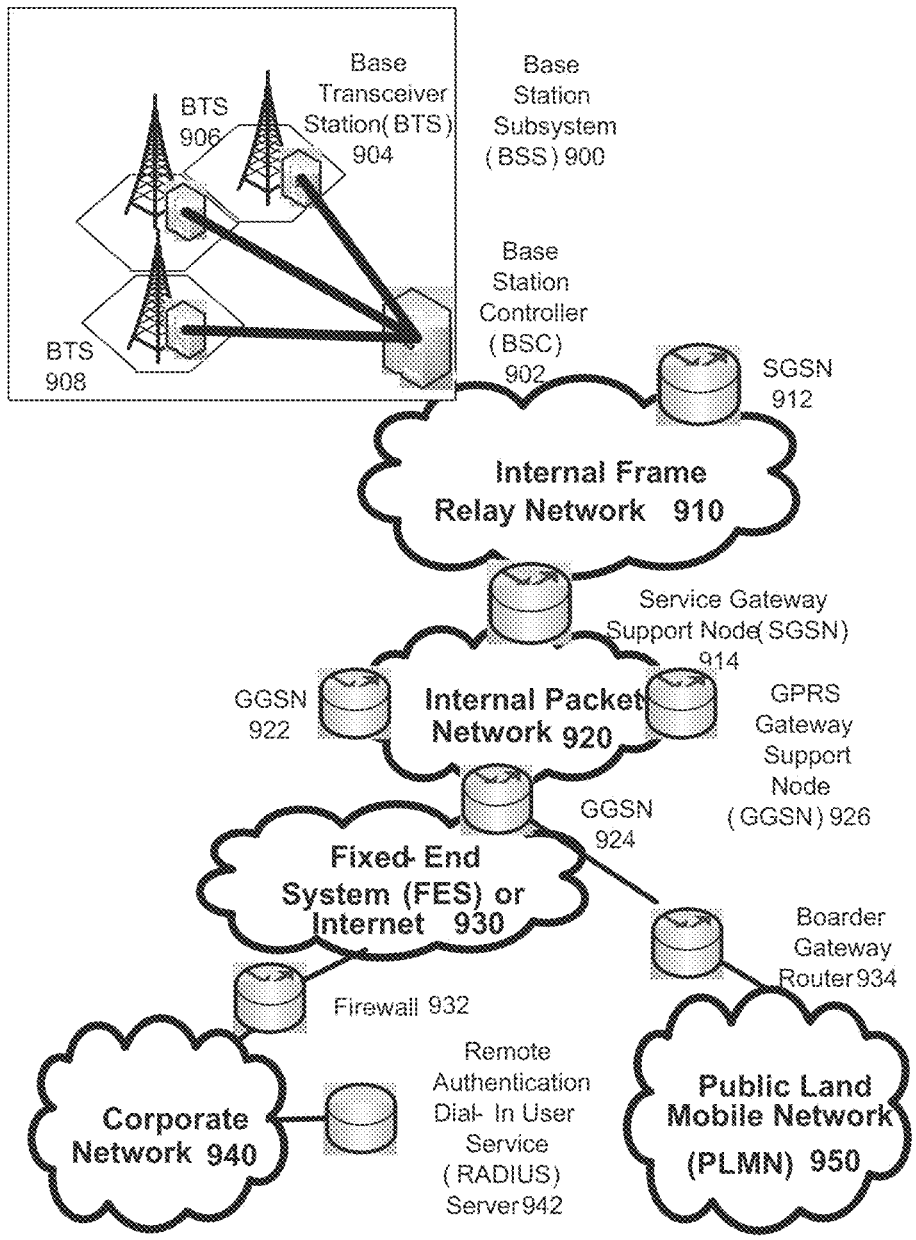
FIG. 8 is a block diagram of an exemplary packet-based mobile cellular network environment, such as a GPRS network, in which integrated visual voicemail communications may be implemented.

FIG. 8 depicts an overall block diagram of an exemplary packet-based mobile cellular network environment, such as a GPRS network, in which the systems and methods for integrated visual voicemail communications such as those described herein can be practiced. In an example configuration, network 201 as illustrated in FIG. 2 may be encompassed by or interact with the network environment depicted in FIG. 8. Similarly, wireless device 211 may communicate or interact with a network environment such as that depicted in FIG. 8. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., wireless device 211) become connected to the wireless network. In exemplary fashion, the packet traffic originating from user devices (e.g., wireless device 211) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 9:
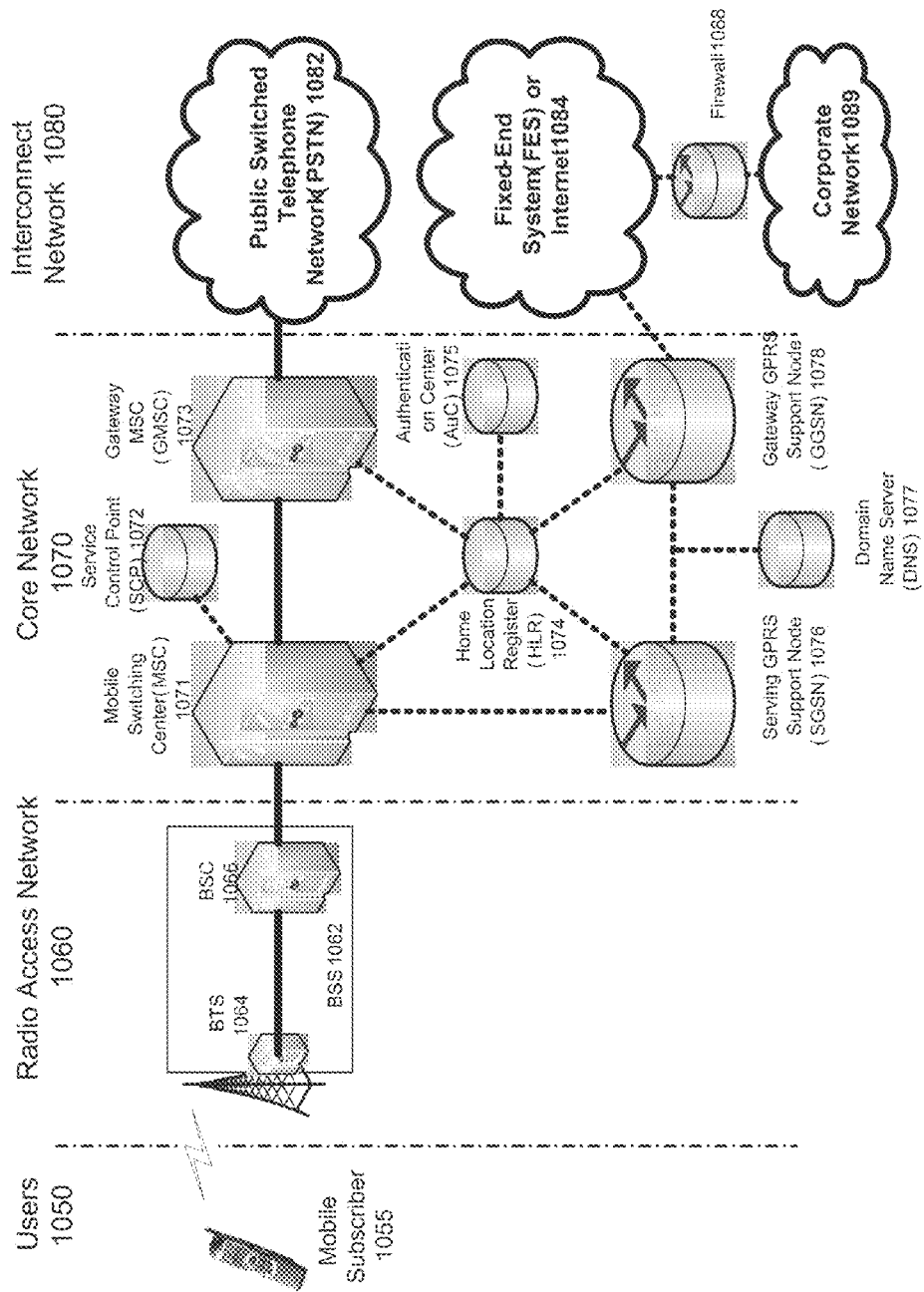
FIG. 9 illustrates a non-limiting, exemplary architecture of a typical GPRS network, segmented into four groups, in which integrated visual voicemail communications may be implemented.

FIG. 9 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 9). In an example embodiment, the device depicted as mobile subscriber 1055 may comprise wireless device 211. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 9, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as wireless device 211, used by an end user of a mobile cellular service or a wireless provider. When a mobile subscriber turns on his or her mobile device, the mobile device may go through an attach process by which the mobile device attaches to an SGSN of the GPRS network. In FIG. 9, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076.

The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of integrated visual voicemail communications such as those described herein can include but are not limited to Gateway GPRS Support Node tables, Fixed End System router tables, firewall systems, VPN tunnels, and any number of other network elements as required by the particular digital network.

Figure 10:
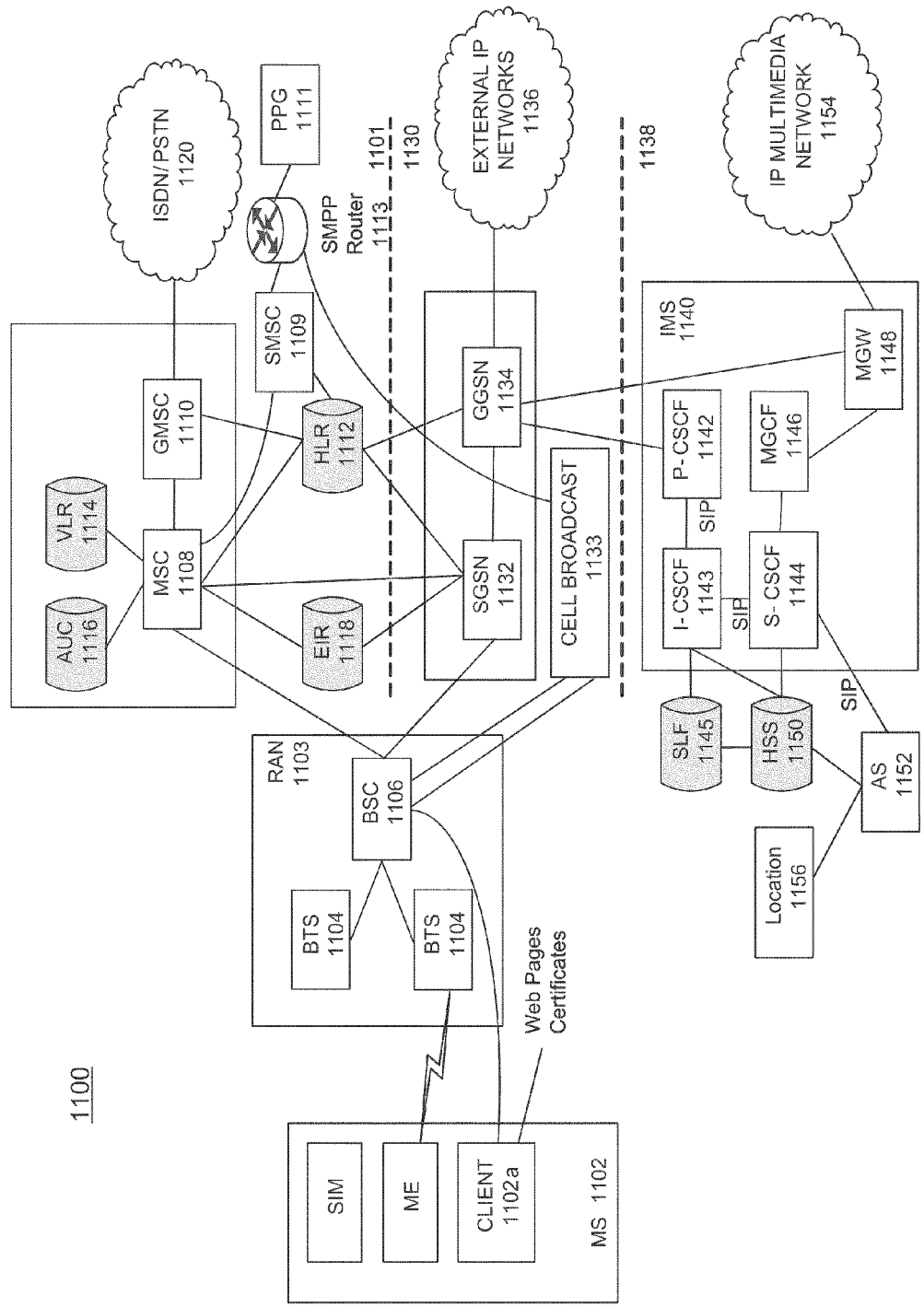
FIG. 10 illustrates a non-limiting alternate block diagram of an exemplary GSM/GPRS/IP multimedia network architecture in which integrated visual voicemail communications may be implemented.

FIG. 10 illustrates another exemplary block diagram view of a GSM/GPRS/IP multimedia network architecture 1100 in which the systems and methods for integrating visual voicemail communications such as those described herein can be incorporated. As illustrated, architecture 1100 of FIG. 10 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., wireless device 211) that is used by mobile subscribers, in one embodiment with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision is based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for integrated visual voicemail communications have been described in connection with various communications devices and computing devices/processors, the underlying concepts can be applied to any communications or computing device, processor, or system capable of implementing the integrated visual voicemail communications systems and methods described. The various techniques described herein can be implemented in connection with hardware or software or, where appropriate, with a combination of both. Thus, the methods and apparatuses for integrated visual voicemail communications, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for integrated visual voicemail communications. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for integrated visual voicemail communications can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for integrated visual voicemail communications. When implemented on a general-purpose processor, the program code combines with the processor to provide a unique apparatus that operates to invoke the functionality of integrated visual voicemail communications as described herein. Additionally, any storage techniques used in connection with a visual voicemail system can invariably be a combination of hardware and software.

While integrated visual voicemail communications has been described in connection with the various embodiments of the various figures, it is to be understood that other similar embodiments can be used or modifications and additions can be made to the described embodiments for performing the same function of integrated visual voicemail communications without deviating therefrom. For example, one skilled in the art will recognize that integrated visual voicemail communications as described in the present application may apply to any environment, whether wired or wireless, and may be applied to any number of such devices connected via a communications network and interacting across the network. Therefore, integrated visual voicemail communications should not be limited to any single embodiment, but rather should be construed in breadth and scope in accordance with the appended claims.

What is claimed is:

1. A method comprising:
   determining, at a visual voicemail server, that a visual voicemail for a wireless device is available, the visual voicemail including a first content and an indicator of a location of a second content that is of a different type than the first content;
   establishing a packet data protocol context for the wireless device;
   obtaining, at the visual voicemail server, the second content;
   facilitating establishment of a single transmission control protocol session between the visual voicemail server and the wireless device, the single transmission protocol session being based at least in part on the packet data protocol context;
   formatting, by the visual voicemail server, the first content and the second content for transmission via the single transmission protocol session; and
   transmitting the first content and the second content from the visual voicemail server to the wireless device via the single transmission control protocol session.

2. The method of claim 1, further comprising transmitting a notification of the visual voicemail to the wireless device.

3. The method of claim 1, further comprising receiving visual voicemail client data at the visual voicemail server from the wireless device via the single transmission control protocol session.

4. The method of claim 3, further comprising manipulating the second content at the visual voicemail server based on the visual voicemail client data.

5. The method of claim 1, wherein the first content is one of an audio voice message and a multimedia content.

6. A computer-readable storage medium that is not a propagating signal, the computer-readable storage medium comprising executable instructions that when executed by a processor cause the processor to effectuate operations comprising:
   determining that a visual voicemail for a wireless device is available, the visual voicemail including a first content and an indicator of a location of a second content that is of a different type than the first content;

establishing a packet data protocol context for the wireless device;

causing a visual voicemail server to obtain the second content;

facilitating establishment of a single transmission control protocol session between the visual voicemail server and the wireless device, the single transmission protocol session being based at least in part on the established packet data protocol context, at the visual voicemail server with the wireless device;

formatting, by the visual voicemail server, the first content and the second content for transmission via the single transmission protocol session;

transmitting the formatted first content and second content from the visual voicemail server to the wireless device via the single transmission control protocol session.

7. The computer-readable storage medium of claim 6, further comprising transmitting a notification of the visual voicemail.

8. The computer-readable storage medium of claim 6, the operations further comprising receiving visual voicemail client data at the visual voicemail server from the wireless device via the single transmission control protocol session.

9. The computer-readable storage medium of claim 8, the operations further comprising manipulating the second content at the visual voicemail server based on the visual voicemail client data.

10. The computer-readable storage medium of claim 6, wherein the second content type comprises messaging content, and wherein obtaining the second content at the visual voicemail server comprises requesting the second content from a messaging server.

11. The computer-readable storage medium of claim 6, wherein the second content type comprises multimedia content, and wherein obtaining the second content at the visual voicemail server comprises requesting the second content from a multimedia content server.

12. The computer-readable storage medium of claim 6, wherein the first content is one of an audio voice message and a multimedia content.

13. An apparatus comprising:
a processor; and
memory coupled to the processor, the memory comprising executable instructions that when executed by the processor cause the processor to effectuate operations comprising:
  determining that a visual voicemail for a wireless device is available, the visual voicemail including a first content and an indicator of a location of a second content that is of a different type than the first content;
  establishing a packet data protocol context for the wireless device;
  obtaining the second content at a visual voicemail server;
  facilitating establishment of a single transmission control protocol session between the visual voicemail server and the wireless device, the single transmission protocol session being based at least in part on the established packet data protocol context, at the visual voicemail server with the wireless device;
  formatting, by the visual voicemail server, the first content and the second content for transmission via the single transmission protocol session; and
  transmitting the first content and the second content from the visual voicemail server to the wireless device via the single transmission control protocol session.

14. The apparatus of claim 13, the operations further comprising transmitting a notification of the visual voicemail to the wireless device.

15. The apparatus of claim 13, the operations further comprising receiving visual voicemail client data at the visual voicemail server from the wireless device via the single transmission control protocol session.

16. The apparatus of claim 13, wherein the second content type comprises one of voicemail content, messaging content, or multimedia content.

17. The apparatus of claim 13, the operations further comprising providing the second content to an application configured on the wireless device.

18. The apparatus of claim 13, the operations further comprising manipulating the second content at the visual voicemail server.

19. The apparatus of claim 13, the operations further comprising manipulating the second content at the visual voicemail server based at least in part on client data received via the single transmission control protocol session.

20. The apparatus of claim 13, wherein the first content is one of an audio voice message and a multimedia content.

* * * * *